Sept. 29, 1959  P. G. KIEHL ET AL  2,906,170
VIEWER
Filed May 16, 1955  2 Sheets-Sheet 1
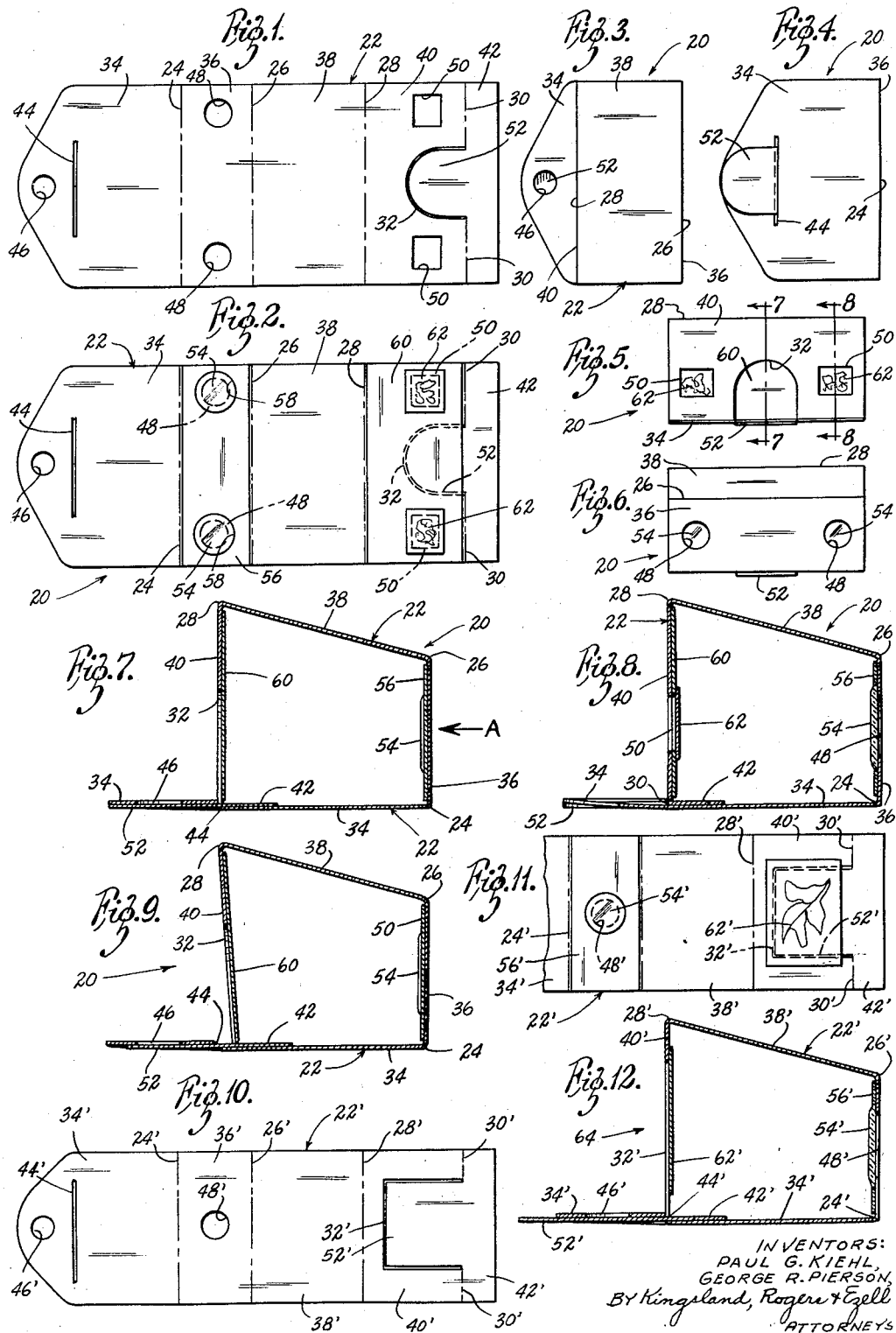
INVENTORS:
PAUL G. KIEHL,
GEORGE R. PIERSON,
BY Kingsland, Rogers & Ezell
ATTORNEYS Sept. 29, 1959  P. G. KIEHL ET AL  2,906,170
VIEWER
Filed May 16, 1955  2 Sheets-Sheet 2
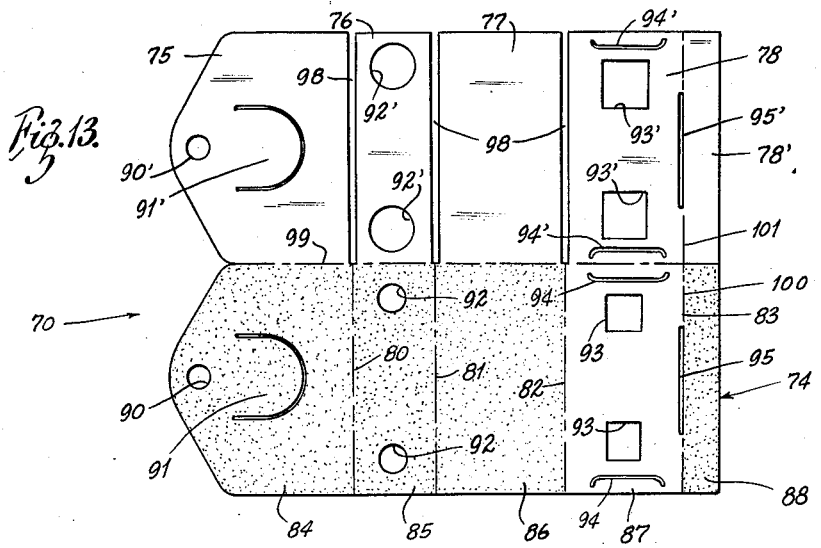
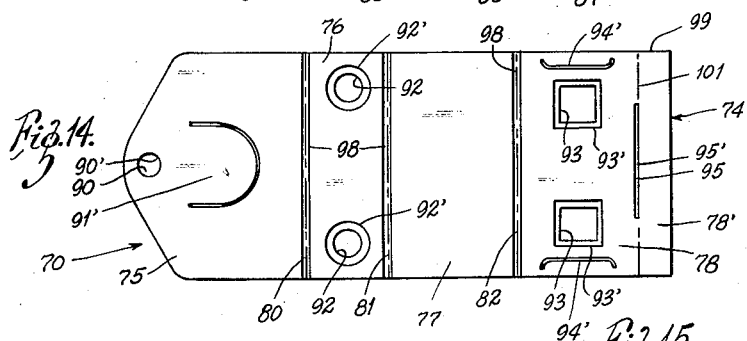
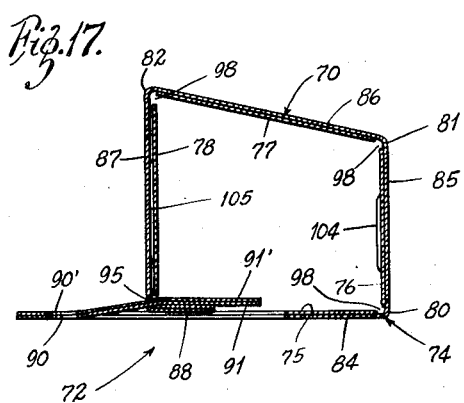
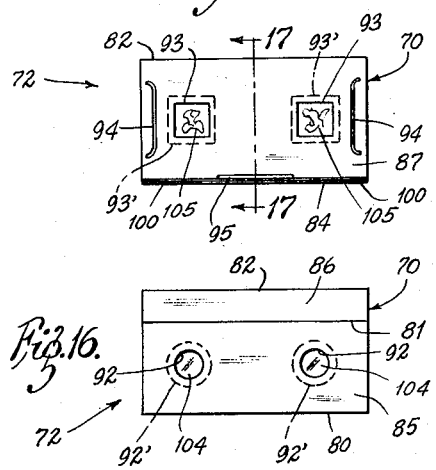
INVENTORS:
PAUL G. KIEHL,
GEORGE R. PIERSON,
By Kingsland, Rogers & Ezell
ATTORNEYS United States Patent Office 2,906,170
Patented Sept. 29, 1959

2,906,170

VIEWER

Paul G. Kiehl, St. Louis, and George R. Pierson, Lemay, Mo.

Application May 16, 1955, Serial No. 508,567

4 Claims. (Cl. 88—29)

The present invention relates generally to viewers, and more particularly to mailing-type viewers.

Numerous types of stereoscopic and other viewers have been devised over a period of many years. The disposable type of viewers heretofore known are complicated in form and, in the main, are not suited for mailing.

Therefore, an object of the present invention is to provide a novel mailing-type viewer which is of simple form and is readily adapted for mailing.

In brief, the present invention comprises a flat piece of cardboard, or other suitable material, of single or multiple parts scored and die-cut for eventual folding into an open-ended box for viewing of the provided picture or pictures. The lens panel and the picture panel are relatively movable longitudinally and transversely for viewing adjustment. The lens and the picture are suitably attached to or held in connection with the flat piece of cardboard, or the like, providing a flat member which may be mailed in a suitable envelope, or otherwise. Several modifications are disclosed herein, directed to stereoscopic or to two-dimensional viewers.

Hence, an object of the present invention is to provide a readily mailable viewer of the stereoscopic or of the two-dimensional type.

Another object is to provide a novel mailable viewer that is essentially a single piece of initially flat material which is die-cut and scored, and to which lens members and pictures are added.

Another object is to provide a novel mailable viewer which incorporates means for adjusting the focus of the lens.

Another object is to provide a novel mailable viewer which is of a form lending itself to ready and inexpensive production.

Another object is to provide a novel mailable viewer which may be readily formed for viewing the picture with minimum instruction, and which includes pockets or tabs for removably retaining pictures.

Other objects are to provide a novel mailable viewer which is inexpensive, which occupies a small amount of display and storage space, which will render long service even though of the disposable type, and which otherwise fulfills the objects and advantages sought therefor.

The foregoing and other objects and advantages are apparent from the following description taken with the acompanying drawings, in which:

Figure 1 is a plan view of a flat scored and die-cut member which forms the base of one exemplification of the present novel viewer;

Figure 2 is a plan view of one exemplification of a complete viewer formed in accordance with the teachings of the present invention, the viewer being in flat extended relation;

Figure 3 is a top plan view of the viewer folded into an open-ended box for looking at the picture;

Figure 4 is a bottom plan view thereof;

Figure 5 is a rear elevational view thereof;

Figure 6 is a front elevational view thereof;

Figure 7 is an enlarged cross-sectional view taken on substantially the line 7—7 of Figure 5;

Figure 8 is an enlarged cross-sectional view taken on substantially the line 8—8 of Figure 5;

Figure 9 is a cross-sectional view similar to Figure 7, but illustrating the lens supporting panel in a position adjusted closer to the picture supporting panel;

Figure 10 is a plan view of a member forming the base of a modified viewer;

Figure 11 is a plan view of the modified viewer in flat relation, a portion being broken away for conservation of space;

Figure 12 is an enlarged central, longitudinal cross-sectional view through the modified viewer folded into open-ended box form for looking at the picture.

Figure 13 is a plan view of a flat scored and die-cut member which forms the base of a modification of the present novel viewer;

Figure 14 is a plan view thereof illustrating one-half folded over the other half and in secured relation thereto;

Figure 15 is a view of the instant modification complete and folded into viewing form, looking toward the pictures;

Figure 16 is an end view thereof looking toward the lenses; and

Figure 17 is an enlarged cross-sectional view taken on substantially the line 17—17 of Figure 15.

Referring to the drawing more particularly by reference numerals, 20 indicates generally a mailable stereoscopic viewer constructed in accordance with the teachings of the present invention which is illustrated in Figures 1–9. The viewer 20 includes a base 22 which comprises a suitable scored and die-cut single sheet of cardboard, or the like. The base 22 is shown in Figure 1 as scored along the lines 24, 26, 28, and line segments 30, the latter being joined by an arcuate cut 32. Panels 34, 36, 38, 40, and 42 are thus formed. A tongue-receiving slot 44 and an aperture 46 are die-cut in the panel 34. Spaced lens apertures 48 are die-cut in the panel 36. Picture windows 50 are die-cut in the panel 40 in alignment with the apertures 48. The panel 42 includes a tongue 52 of less width than the slot 44 to permit lateral movement which is cut out of the panel 40 by the arcuate cut 32. This lateral adjustment is effective to bring the lenses and pictures into right angle relationship with a line through both.

Eye-piece lenses 54 are mounted over the apertures 48 and are maintained in position by a strip 56 of cardboard, or the like, glued or otherwise secured to the panel 36. As illustrated, each eye-piece lens 54 is disposed within an opening 58 in the strip 56 of selected greater diameter than the aperture 48 within the panel 36, the eye-piece lens 54 being of substantially the same diameter as the opening 58. Suitable glue, a gummed label, or the like, may be used to keep the lens 54 against the panel 36 and within the aperture 58.

A picture slide 60 is glued or otherwise secured to the panel 40 with stereoscopic pictures 62 glued or otherwise secured thereto disposed in viewable positions over the windows 50.

It is to be noted that the viewer 20 is adapted to be sold in the flat form illustrated in Figure 2. A suitable mailing envelope can be employed, or the base 22 can include space for an address and a stamp. In the latter case, a simple mask would normally be provided for the lens 54 and the pictures 62.

In use, the viewer 20 is folded into the open-ended box form illustrated in Figures 3–9. The viewer 20 is folded along the several score lines and the tongue 52 is inserted through the slot 44, this latter relationship providing an adjustment between the panels 36 and 40, as is clear from Figures 7 and 9. Manifestly, the pictures 62 may be viewed through the lens 54 as indicated by the arrow A in Figure 7. When the viewer 20 is not in use, it may be flattened for storage purposes.

It should be noted that the picture slide 60 may be removably supported on or adjacent the panel 40 to provide for use of the device with a plurality of pictures. As a matter of fact, the relationship of the panels 34, 38 and 40 is such that a picture slide 60 will remain in position for viewing without the necessity of any securing means where the height of the slide 60 is substantially equal to the height of the panel 40.

In Figures 10-12, there is illustrated a modified viewer 64, corresponding parts being designated by the same reference numerals primed employed in the description of the viewer 20. The viewer 64 is not stereoscopic, a single lens 54' and a single picture 62' being employed. Otherwise, the viewer 64 is the same as the viewer 20.

Referring to Figures 13-17, 70 indicates a blank from which a modified viewer 72 is formed. The blank 70 is illustrated in flat form in Figure 13 and includes a base part 74, and integral side panels 75, 76, 77 and 78. The base part 74 is scored at 80, 81, 82 and 83 for folding to provide panels 84, 85, 86, 87 and 88.

Die-cut in the panel 84 is an aperture 90 for hanging purposes and a tongue 91. Cut in the panel 85 are spaced annular openings 92 for lenses. In the panel 87 are cut windows 93 through which the pictures may be viewed, auxiliary mounting tabs or ears 94, and a slot 95 to receive the tongue 91 which is wider than the tongue 91 to permit lateral movement therein. The tabs 94 may be omitted if desired.

The panels 75—78 are similarly cut and are referenced by primed numerals, the openings 92' being a little larger than the openings 92 in order that the latter may form with the former wells for receiving the lenses, and the windows 93' being a little larger than the windows 93 for tolerance purposes in forming the viewer. It will be noted that the several panels 75—78 are separated by cut-outs 98 to facilitate folding. A cut score line 99 running the full length of the base parts 74 and cut score lines 100 and 101 also facilitate folding.

Suitable glue or adhesive is provided on the panels 84, 85, 86 and 88 in order to secure the panels 75, 76, 77 and the end portion 78' of the panel 78 against removal once folded into the relationship of Figure 14.

In Figures 15-17 is illustrated the complete viewer 72 which includes lenses 104 glued or otherwise secured in the wells formed by the openings 92 and 92' as aforesaid, and a 3-D picture unit 105. The picture unit 105 may be inserted in the pocket formed by the unsecured panels 78 and 87, or it may be held between the tabs 94 if provided. The relationship of the several parts is shown in the cross section of Figure 17. Furthermore, the relationship is similar to that of the initially described exemplifications, with the exception that the tongue 91 and the slot 95 are reversed. It is noted here that the tongue 52 and slot 44 may be reversed from the positions shown, if desired.

The pocket formed by the panels 78 and 87 may be divided by the application of adhesive between the windows. Further, individual pockets may be formed for insertion of pictures from each side or from on top or bottom. It is manifest, of course, that pictures may be secured permanently or removably directly to the outside of either panel 78 or 87, if desired. It is also manifest from Figure 17 and from the statement in the immediately preceding paragraph that the relationship of parts is the same as in the above-described modifications, hence, a picture unit 105 will remain in position for viewing without the necessity of any securing means where the height of the picture unit 105 is substantially equal to the height of the panel 78.

It will be observed that the tabs 94 extend outwardly and the tabs 94' extend inwardly. Hence, pictures may be held either within or without the viewer 72 by these tabs 94 and 94'. The tabs 94 are particularly useful in viewing pictures mounted in a series.

The importance of the single sheet of material forming the base 22 is emphasized. It provides with the added lens and pictures a flat mailing piece.

It is manifest from the foregoing that there has been provided a viewer which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. A viewer comprising, in combination, an integral base including a bottom panel, a front panel, a top panel and a rear panel, lens members mounted on said front panel, picture windows formed in said rear panel, said front panel being of lesser height than said rear panel, said top panel converging forwardly toward said bottom panel, and a picture slide removably mounted adjacent said rear panel and being maintained in position by the converging relation of said top panel to said bottom panel, said rear panel being pivotally movable toward and away from said front panel, said bottom panel including a tongue disposed transversely thereof, said rear panel including a slot adjacent the lower edge, said tongue engaging in said slot and maintaining said rear panel in selected adjusted position.

2. A viewer comprising an integral base including an elongated base part divided into panels, a complementary panel secured in overlying relation to each base part panel, lenses mounted in one composite panel, means in another composite panel for holding pictures, a bottom panel, and means for maintaining said base in a formed configuration for viewing pictures, said last-named means being adjustable to permit relative movement of the lenses and pictures toward each other and transversely of a straight line through both, said last-named means including a tongue formed in said bottom panel and extending transversely thereof and a slot in said picture panel, said tongue engaging in said slot and maintaining said picture panel in selected adjusted position.

3. A viewer comprising, in combination, an integral base including a bottom panel, a front panel, a top panel and a rear panel, lens members mounted on said front panel, and picture windows formed in said rear panel, one of said rear panel and front panel being pivotally connected to said top panel and beign movable toward and away from said other panel along one edge, said bottom panel including a tongue disposed transversely thereof, said one of said rear panel and front panel including a slot adjacent the lower edge, said tongue engaging in said slot and maintaining said one of said rear panel and front panel in selected adjusted position, said viewer being open at the ends affording ready exchange of picture slides.

4. A viewer comprising, in combination, an integral base including a bottom panel, a front panel, a top panel and a rear panel, lens members mounted on said front panel, picture windows formed in said rear panel, one of said rear panel and front panel being pivotally connected to said top panel and being movable toward and away from said other panel along one edge, said bottom pnael including a tongue disposed transversely thereof, said one of said rear panel and front panel including a slot adjacent the lower edge, said tongue engaging in said slot and maintaining said one of said rear panel and front panel in selected adjusted position, and said one movable panel also being transversely movable of a line through both the rear panel and front panel for aligning the lens members with pictures viewable through said picture windows, said slot being wider than said tongue to permit said transverse movement.

References Cited in the file of this patent

UNITED STATES PATENTS

| | | |
|---|---|---|
| 2,543,240 | Hutchinson | Feb. 27, 1951 |
| 2,692,530 | Gowland | Oct. 26, 1954 |
| 2,715,853 | Austin | Aug. 23, 1955 |
| 2,724,991 | Levine | Nov. 29, 1955 |
| 2,789,460 | Kaufman | Apr. 23, 1957 |
| 2,794,367 | Turner | June 4, 1957 |

FOREIGN PATENTS

| | | |
|---|---|---|
| 11,139 | Great Britain | of 1907 |
| 710,240 | Germany | Sept. 8, 1941 |